United States Patent
Tsuchiya et al.

(10) Patent No.: US 6,389,371 B1
(45) Date of Patent: May 14, 2002

(54) SIGNAL PROCESSING CIRCUIT OF SENSOR

(75) Inventors: Munenori Tsuchiya; Kazuya Yamagishi; Shigemitsu Ogawa, all of Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 0 days.

(21) Appl. No.: 09/290,945

(22) Filed: Apr. 13, 1999

(30) Foreign Application Priority Data

Apr. 14, 1998 (JP) ............................................ 10-102847

(51) Int. Cl.$^7$ ......................... G06F 15/00; G01L 27/00
(52) U.S. Cl. ........................... 702/189; 702/85; 702/98; 702/104
(58) Field of Search ............................ 702/189, 85, 88, 702/98, 104, 116; 73/718, 724; 361/283.1, 283.4

(56) References Cited

U.S. PATENT DOCUMENTS

| | | | |
|---|---|---|---|
| 4,800,513 A | * 1/1989 | Deutsch | 702/107 |
| 4,860,232 A | * 8/1989 | Lee et al. | 702/104 |
| 4,951,236 A | 8/1990 | Kawate et al. | |
| 4,982,351 A | 1/1991 | Kawate et al. | |
| 5,000,275 A | 3/1991 | Bullivant | |
| 5,051,937 A | 9/1991 | Kawate et al. | |
| 5,255,975 A | * 10/1993 | Adams | 702/99 |
| 5,361,218 A | * 11/1994 | Tripp et al. | 702/88 |
| 5,770,802 A | * 6/1998 | Berthold et al. | 73/765 |

FOREIGN PATENT DOCUMENTS

| | | |
|---|---|---|
| EP | 0 245 031 B1 | 7/1993 |
| JP | 62-267636 | 11/1987 |
| JP | 2-28931 | 1/1990 |

OTHER PUBLICATIONS

U.S. Patent Application Ser. No. 09/294 748, filed Apr. 19, 1999.

* cited by examiner

*Primary Examiner*—Bryan Bui
(74) *Attorney, Agent, or Firm*—Flynn, Thiel, Boutell & Tanis, P.C.

(57) ABSTRACT

A processor of a signal processing circuit for calibrating an electro-capacitance pressure sensor includes a coefficient arithmetic section for calculating calibration value and a calibration arithmetic section. The calibration arithmetic section calculates an electro-capacitance ratio between electro-capacitance $C1$ and $C2$ detected by an electro-capacitance pressure sensor and conducts a calibration calculation from the electro-capacitance ratio to output a converted pressure value. The processor includes a fundamental arithmetic section for conducting a calculation given by $f=(Z-W)/(X-Y)$ for predetermined arguments $X$, $Y$, $Z$ and $W$ input by the coefficient arithmetic section or the calibration arithmetic section and for outputting the calculation result f to the one of the coefficient arithmetic section and the calibration arithmetic section providing the input. The fundamental arithmetic section provides shared calculating for the coefficient calculation and calibration calculation.

9 Claims, 8 Drawing Sheets

F I G. 5
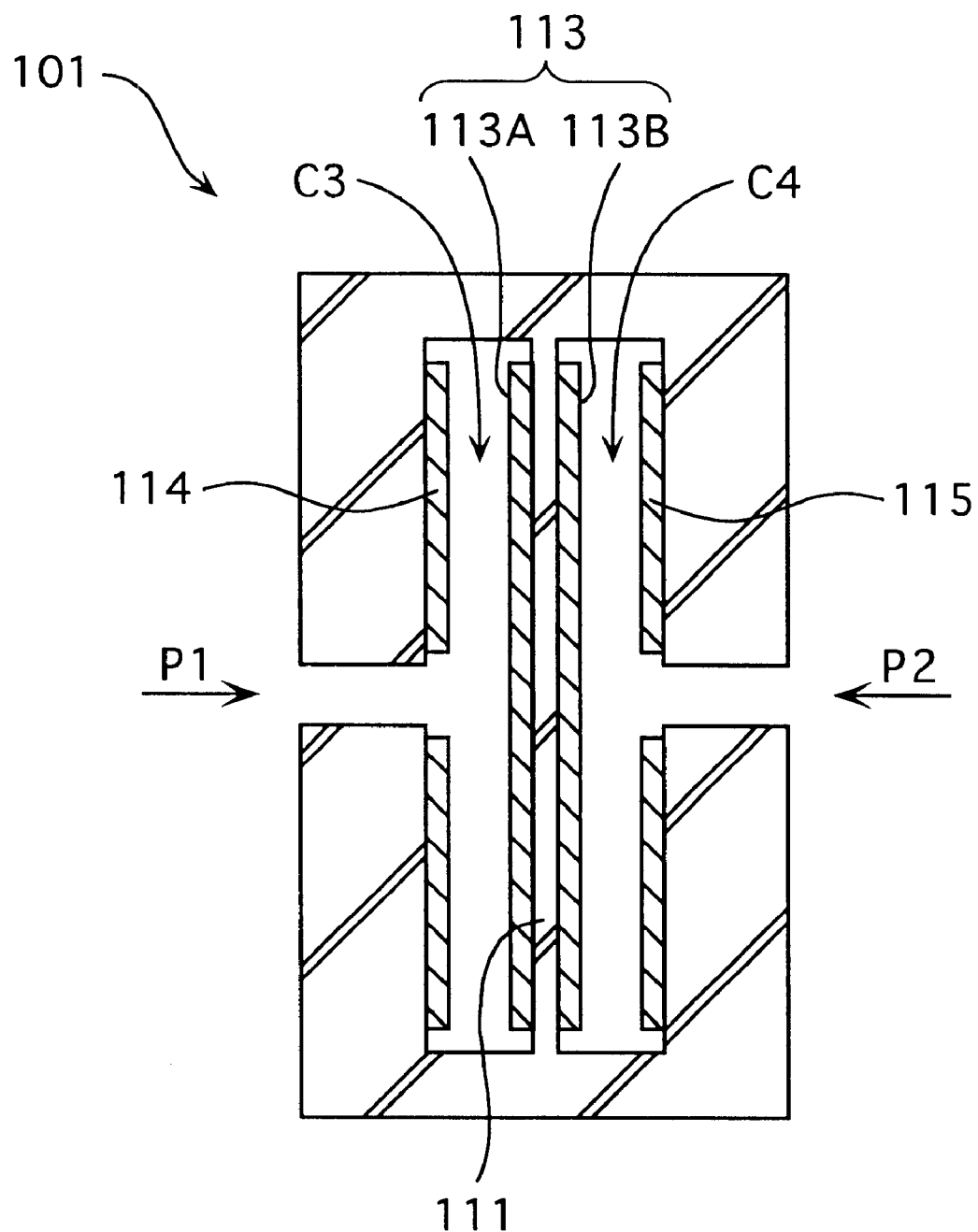

F I G. 7
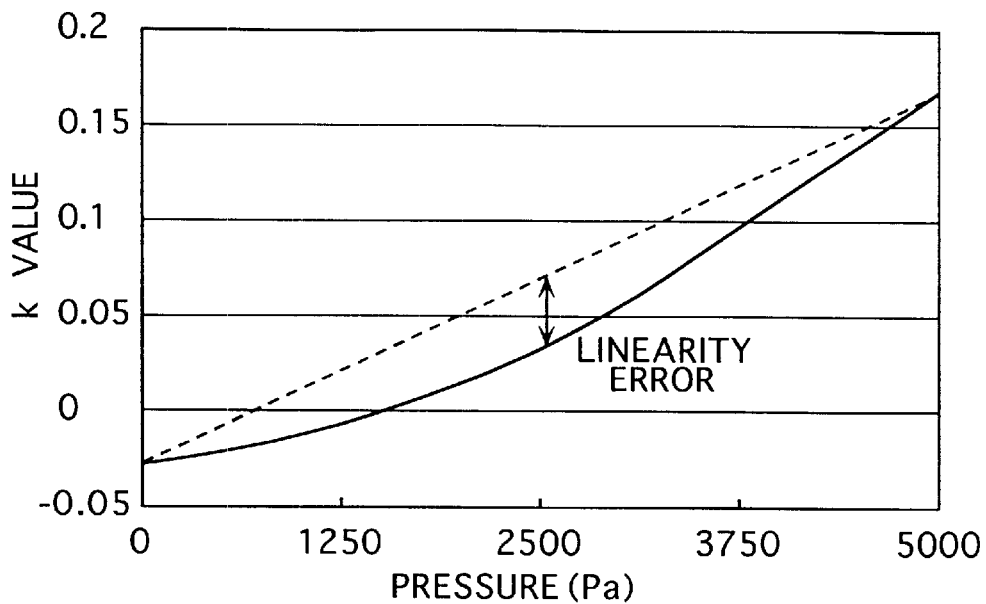
F I G. 8
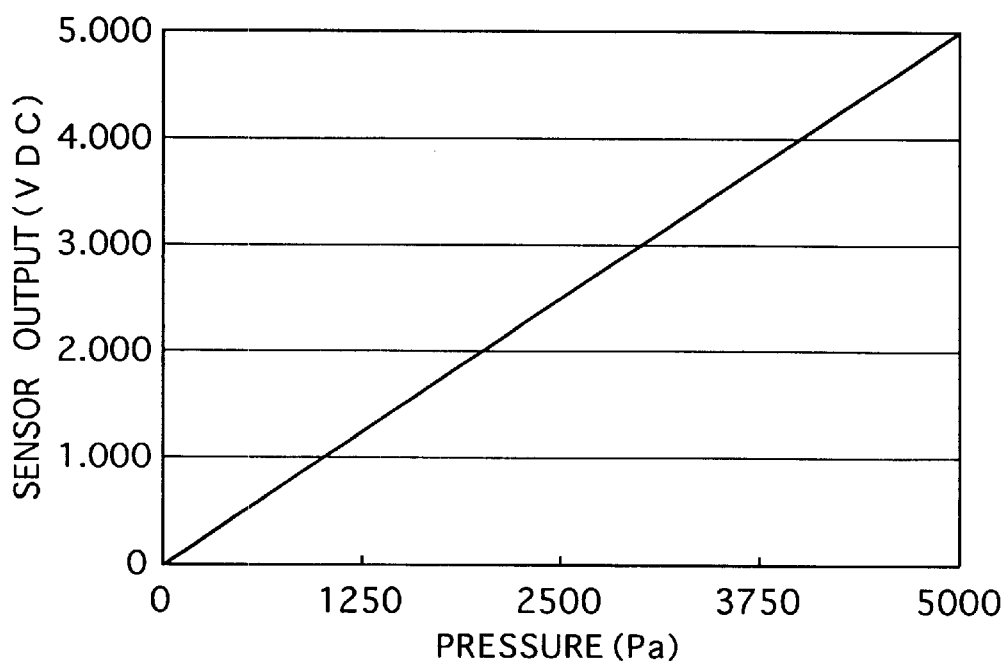

SIGNAL PROCESSING CIRCUIT OF SENSOR

BACKGROUND OF THE INVENTION

1. Field of the Invention

The present invention relates to a signal processing circuit for processing an electric signal of a sensor, the sensor having a sensor element for electrically detecting a change in physical amount of a workpiece and a signal output means for detecting the change of the sensor element and outputting the electric signal.

2. Description of the Related Art

Conventionally, a sensor having a sensor element for electrically detecting a change in a physical amount of a workpiece and a signal outputting means for detecting the change of the sensor chip and outputting an electric signal is used.

For example, an electro-capacitance type sensor having a diaphragm deforming in proportion to a change in pressure of the workpiece, a substrate for supporting the diaphragm, a sensor element for detecting the deformation of the diaphragm as a change in electro-capacitance between the diaphragm and the substrate and an electro-capacitance signal output means for detecting the change in the sensor element and outputting an electro-capacitance signal is known as such sensor.

Such electro-capacitance sensor is used as a pressure sensor and an acceleration sensor. In the pressure sensor, for example, the deformation of the diaphragm in proportion to the change in the pressure of the workpiece can be electrically detected as a change in the electro-capacitance, which is suitable for controlling and measuring pressure utilizing a computer.

As a specific example, a pressure detector 90 using an electro-capacitance pressure sensor is shown in FIG. 10.

In the figure, the pressure detector 90 has a base member 91 which has a fitting 92 fixedly screwed to a portion to be detected. The fitting 92 is provided with a pressure inlet 93 to which pressure is introduced from an inside of the portion to be detected. The base member 91 has a greatly enlarged diameter remote from the fitting 92 and a pressure sensor 1 is installed thereon to cover the enlarged opening. A sealing member 94 such as an O-ring is inserted between the pressure sensor 1 and the base member 91 in order to ensure sealability therebetween.

The pressure sensor 1 has a diaphragm 11 on a surface facing the pressure inlet 93, the diaphragm 11 receiving the pressure from the pressure inlet 93 to displace in a direction intersecting the surface. The pressure sensor 1 outputs the displacement of the diaphragm 11 as a change in electro-capacitance.

A processor 5 is mounted on the pressure sensor 1 remote from the fitting 92. The processor 5 is connected to an electrode of the pressure sensor 1 through a through-hole etc. provided on the pressure sensor 1 to receive a signal showing the change in the electro-capacitance and to output to the outside after amplifying and conducting predetermined arithmetic processing etc.

An output substrate 95 is mounted for outputting the signal from the processor 5 to the outside. The processor 5 and the output substrate 95 are wired by wire-bonding etc. and a durable cable 96 is wired to connect the output substrate 95 and the outside.

The base member 91 is covered by a cover member 97, in which all of the pressure sensor 1, the processor 5, the output substrate 95 etc. are accommodated.

In the electro-capacitance sensor used in the above-described pressure detector and the like, the actual pressure change and the electro-capacitance change do not linearly correspond within all the measurement range. Moreover, when the electro-capacitance sensors are mass-produced, slight deviation is caused in each product.

Accordingly, a calibration work is conducted in order to measure highly accurately irrespective of measurement range and the electro-capacitance sensor employed, in which respective sensors are adjusted by a potentiometer or a thick-film resistor or a thin-film resistor is trimmed by laser trimming.

However, since such calibration work requires an outside adjusting device as well as the sensor and the calibration work has to be conducted for respective sensors, large cost is necessary for the calibration work after manufacturing the sensors.

In view of above problem, a self-calibrating sensor is proposed (Japanese Patent Publication No. 2676959), in which a signal processing circuit having processor including adjusting device is integrally provided on the electro-capacitance sensor, so that the calibration work is conducted by the sensor itself.

Specifically, the self-calibration method by the processor of the above publication is summarized as follows.

In general, there is a relationship represented by following formula (1) between a sensor voltage output V in proportion to the change in the electro-capacitance of the sensor and pressure P.

$$V = \frac{a \times P}{b - P^2} + c \tag{1}$$

Here, a, b and c are calibration values. Calibration of the sensors is equal to finding proper values for the calibration values a, b and c.

When standard pressures for the calibration are set as $P_0$, $P_1$ and $P_2$, and sensor outputs corresponding thereto are set as $V_0$, $V_1$ and $V_2$, following formulas (2) to (4) can be derived by assigning above values into the formula (1).

$$V_0 = \frac{a \times P_0}{b - P_0^2} + c \tag{2}$$

$$V_1 = \frac{a \times P_1}{b - P_1^2} + c \tag{3}$$

$$V_2 = \frac{a \times P_2}{b - P_2^2} + c \tag{4}$$

The processor solves simultaneous equations of the formulas (2) to (4) to calculate the calibration values a, b and c and the calibration values are stored in a memory such as E2PROM (or EEPROM; Electrically Erasable and Programmable Read Only Memory) provided on the sensor.

In actual measurement, the pressure P is calculated after correcting the detected sensor voltage output V using the calibration values a, b and c calculated by the above formulas (2) to (4). More specifically, in the processor on the sensor, the calibration values a, b and c obtained by the above formulas (2) to (4) are assigned to formula (5) representing solution of the quadratic equation of formula (1), and the detected sensor voltage output V is corrected.

$$P = \frac{a \pm \sqrt{a^2 + 4 \times (V-c)^2 \times b}}{-2 \times (V-c)} \quad (5)$$

According to the self-calibrating sensor, since the adjustment is conducted by the processor of the signal processing circuit integrally provided on the sensor, no calibration work is necessary for respective sensors using separate adjusting device after manufacturing the electro-capacitance sensor, thereby largely reducing the cost required for the calibration work of the sensors.

However, there are following disadvantages in the above-described self-calibrating sensor.

The above-described self-calibrating sensor calculates the calibration values a, b and c using the simultaneous equations of formulas (2) to (4) and corrects the output by the formula (5). Accordingly, the processor of the signal processing circuit needs to include both calculating section of the calibration values a, b and c by the formula (2) to (4) and output correcting section using the formula (5), resulting in complicated structure of the processor. Moreover, the calibration values calculating section according to the formulas (2) to (4) is not used in the actual pressure measurement after calibration, inevitably resulting in unnecessary parts not used for the actual measurement. Accordingly, even though the cost for the calibration work can be reduced, total cost including the cost for respective components is not necessarily reduced on account of complicated structure of the processor in the sensor.

Similar disadvantages also occur to a self-calibrating sensor, in which physical amount of the workpiece is electrically detected and an electric signal is outputted by detecting the change in a sensor element, such as a strain gauge sensor for detecting a deformation of a diaphragm as a change in a strain gauge, not limited to the above-described electro-capacitance sensor.

SUMMARY OF THE INVENTION

An object of the present invention is to provide a signal processing circuit of a sensor for efficiently utilizing the processor without complicating the structure of the processor, thereby reducing total cost of the sensor.

In order to attain the above object, the present invention is characterized in simplifying the structure of the processor by commonizing section for calculating calibration values and section for correcting output.

Specifically, a signal processing circuit of a sensor according to the present invention is for processing an electric signal, the sensor having a sensor element for electrically detecting a change in physical amount of a workpiece and a signal output means for detecting the change of the sensor element and outputting the electric signal. The signal processing circuit is characterized in having a processor for obtaining a reduced value P of the physical amount by calibrating a detected value k obtained by the electric signal with a transforming formula (6) of;

$$P = \frac{\gamma \times (k - \beta)}{1 + \alpha \times (k - \beta)} \quad (6)$$

The processor is further characterized in having; a coefficient arithmetic section for calculating coefficients $\alpha$, $\beta$ and $\gamma$ of the transforming formula by obtaining a detected value corresponding to known physical amount on optional three points within measurement range of the sensor and assigning the detected value to the transforming formula; a calibration arithmetic section for obtaining the reduced value P of the physical amount by assigning the calculated coefficients $\alpha$, $\beta$ and $\gamma$ and calibrating the detected value k detected in accordance with unknown measured physical amount by the transforming formula; and a fundamental arithmetic section for conducting calculation represented by the formula (7) of $$f = \frac{Z - W}{X - Y} \quad (7)$$

based on a predetermined arguments X, Y, Z and W inputted by the coefficient arithmetic section or the calibration arithmetic section and outputting a calculation result f to the coefficient arithmetic section or the calibration arithmetic section.

Here, the sensor element refers to element electrically detecting the physical amount of the workpiece. For instance, the sensor element includes a strain gauge sensor element having diaphragm etc. deforming in proportion to the change in physical amount of the workpiece where the deformation of the diaphragm is detected as a change in the resistance value of the strain gauge, an electro-capacitance sensor element detecting as a change in the electro-capacitance, and other sensor element electrically detecting the change in the physical amount of the workpiece using photodiode and the like without deforming the sensor element itself.

All of the above are sensor elements electrically detecting the change in the physical amount of the workpiece, and requiring calibration work for corresponding the reduced value of the physical amount based on the electric signal and the actual physical amount acting on the sensor element, which can be calibrated by the above described transforming formula (6).

The strain gauge sensor element may include a bridge circuit mutually connecting four strain gauges provided on the diaphragm of, for instance, the pressure sensor having diaphragm deforming in proportion to the change in the pressure of the workpiece. In the strain gauge sensor element, the deformation amount of the diaphragm can be detected as an electric signal by applying a predetermined voltage to an end of the bridge circuit and obtaining the change in potential difference of the other end in proportion to the change in resistance value of the strain gauge. The potential difference may be adopted as the detected value k and may be calibrated by the above transforming formula (6).

The electro-capacitance sensor element may include a movable electrode formed on the diaphragm, and first and second fixed electrodes formed on a substrate supporting the diaphragm opposite to the movable electrode. The electro-capacitance sensor element can detect the deformation amount of the diaphragm by obtaining the change in first electro-capacitance signal C1 between the movable electrode and the first fixed electrode and second electro-capacitance signal C2 between the movable electrode and the second fixed electrode.

The above movable electrode may be formed not only along one side of the diaphragm but may be formed on both sides of the diaphragm. When the movable electrode is formed on one side of the diaphragm, the first and the second fixed electrode support the diaphragm and are parallel formed on the substrate opposing the movable electrode.

Incidentally, when the movable electrode is formed on both sides of the diaphragm, the first fixed electrode opposes one side of the movable electrode and the second fixed electrode opposes the other side of the movable electrode, thereby forming differential pressure sensor for detecting differential pressure etc. of a space partitioned by the diaphragm.

The detected value k may be either one of the electro-capacitance C1 and C2, or difference of the electro-capacitance C1–C2, or, alternatively, electro-capacitance ratio C2/C1 in the above-described electro-capacitance sensor.

The above configuration of the present invention can be described as follows with an example of the electro-capacitance pressure sensor.

As shown in FIG. 1, an electro-capacitance pressure sensor 1 has a diaphragm 11 deforming in a direction orthogonal to the surface thereof by a pressure P to be detected, and a substrate 12 supporting the diaphragm 11 at the outer circumference thereof. The electro-capacitance pressure sensor 1 has a movable electrode 13 formed on a surface of the diaphragm 11 opposing the substrate 12, and first fixed electrode 14 and second fixed electrode 15 formed on the substrate 12 opposing the movable electrode 13, the electrodes 13 to 15 forming the sensor element. The movable electrode 13 follows the deformation of the diaphragm 11 in a direction orthogonal to the surface of the diaphragm 11, so that the movable electrode 13 approaches and recedes from the first fixed electrode 14 and the second fixed electrode 15 by the pressure P acting on the diaphragm 11. As shown in FIG. 2, the first fixed electrode 14 is formed on the substrate 12 in an approximate circle around deformation center of the diaphragm 11, and the second fixed electrode 15 is formed in a ring-shape surrounding outer circumference of the first fixed electrode 14. On the other hand, the movable electrode 13 is formed on the diaphragm 11 in an approximate circle corresponding to edge of the outer circumference of the second fixed electrode 15.

As shown in FIG. 3, the movable electrode 13 and the first fixed electrode 14, and the movable electrode 13 and the second fixed electrode 15 respectively form capacitors. When the electro-capacitance between the movable electrode 13 and the first fixed electrode 14 is C1, relationship shown in formula (8) generally stands true between the electro-capacitance C1 and the pressure P acting on the diaphragm 11. Incidentally, d is a distance between the movable electrode 13 and the first and the second fixed electrode 14 and 15, $\varepsilon_S$ is relative permittivity of a clearance between the movable electrode 13 and the first fixed electrode 14, $\varepsilon_0$ is permittivity in vacuum, S1 is electrode area of the first fixed electrode 14 and A1 is displacement coefficient of the diaphragm 11 by the pressure P in the formula (8).

$$C1 = \frac{\varepsilon_S \times \varepsilon_0 \times S1}{d - P \times A1} \tag{8}$$

Similarly, when the electro-capacitance between the movable electrode 13 and the second fixed electrode 15 is C2, relationship shown in formula (9) generally stands true between the electro-capacitance C2 and the pressure P. Incidentally, S2 is electrode area of the second fixed electrode 15 and A2 is displacement coefficient of the diaphragm 11 by the pressure P in the formula (9).

$$C2 = \frac{\varepsilon_S \times \varepsilon_0 \times S2}{d - P \times A2} \tag{9}$$

Accordingly, the pressure P acting on the diaphragm 11 can be converted by detecting the electro-capacitance C1 and C2 from either one of the formulas (8) and (9).

However, it is known in the electro-capacitance pressure sensor 1 that the above-described electro-capacitance C1 and C2 cause error by temperature change and time change from initial electro-capacitance measurement value $C1_0$ and $C2_0$. Specifically, the electro-capacitance C1 and C2 at a certain time period has a relationship with the initial electro-capacitance measurement value $C1_0$ and $C2_0$ represented by the formulas (10) and (11).

Incidentally, the time change at a certain time period is represented by $\Delta t$ and temperature change is represented by $\Delta T$ as compared to the measurement period of the initial measurement value $C1_0$ and $C2_0$ in the formulas (10) and (11). Time change rate of the capacitor in accordance with the time change $\Delta t$ and temperature change $\Delta T$ is represented by m1 and m2, and temperature change rate is represented by n1 and n2 respectively.

$$C1 = C1_0 \times (1 + \Delta T \times m1 + \Delta t \times n1) \tag{10}$$

$$C2 = C2_0 \times (1 + \Delta T \times m2 + \Delta t \times n2) \tag{11}$$

Since the first fixed electrode 14 and the second fixed electrode 15 are made of the same component, the dielectric in the clearance between the movable electrode 13 and the first and the second fixed electrodes 14 and 15 can be considered common. That is, the capacitor for the electro-capacitance C1 and the capacitor for the electro-capacitance C2 may be considered to be configured of the same structure and the same components.

Accordingly, it is safely considered m1=m2 and n1=n2 in the formulas (10) and (11). Therefore, the error in accordance with the temperature change and the time change can be cancelled by detecting an electro-capacitance ratio k(=C2/C1) between the measured electro-capacitance C1 and the electro-capacitance C2, as shown in formula (12).

$$k = \frac{C2}{C1} = \frac{C2_0}{C1_0} = \frac{\varepsilon_S \times \varepsilon_0 \times S2 \times (d - P \times A1)}{\varepsilon_S \times \varepsilon_0 \times S1 \times (d - P \times A2)} \tag{12}$$

Accordingly, the pressure P can be converted from the electro-capacitance ratio k by the formula (12) without considering the temperature change and the time change by detecting the electro-capacitance C1 and C2 (first correction).

The pressure P can be conducted from the electro-capacitance ratio k by assigning appropriate values to the coefficients α, β and γ in the following formula (13) based on the formula (12) (feedback correction). Incidentally, the formula (13) is identical with the above-described formula (6).

$$P = \frac{\gamma \times (k - \beta)}{1 + \alpha \times (k - \beta)} \tag{13}$$

In the above formula (13), coefficient α is feedback gain, γ is open loop gain and β is offset, each being calibration value for calibrating linearity, gain and offset of the sensor output respectively. The calibration of the electro-capacitance pressure sensor 1 is equal to calculating and storing the calibration value of the coefficients α, β and γ.

The formula (13) stands true irrespective of the temperature change and time change after calculating the coefficients α, β and γ. Accordingly, the pressure P can be accurately calculated by measuring the electro-capacitance ratio k and converting the electro-capacitance ratio k by the processor sing the formula (13).

The most appropriate calibration values of the coefficients α, β and γ are calculated by a coefficient arithmetic section of the processor and the calibration values are calculated by applying known calibration pressure to the electro-capacitance pressure sensor 1 for measuring the electro-capacitance ratio at the point.

Specifically, the electro-capacitance ratio $k_0$ is calculated by measuring the electro-capacitance C1 and C2 under the condition $P_0(=0)$ without applying the pressure to the diaphragm 11 of the electro-capacitance pressure sensor 1. Subsequently, known calibration pressure $P_1$ and $P_2$ are applied to the electro-capacitance pressure sensor 1 and the electro-capacitance ratio $k_1$ and $k_2$ are calculated by measuring the electro-capacitance C1 and C2 at that point. Incidentally, the calibration pressure $P_1$ and $P_2$ are set as $P_2=2P_1$ for the convenience of following calculation.

$P_0$ to $P_2$ and $k_0$ to $k_2$ thus obtained are assigned to the formula (13). Accordingly, the calibration values of the coefficients α, β and γ can be calculated by solving the ternary simultaneous equations for the coefficients α, β and γ as shown in formulas (14) to (16).

$$\alpha = \frac{k_2 - 2 \times k_1 + k_0}{(k_1 - k_0) + (k_2 - k_0)} \qquad (14)$$

$$\beta = k_0 \qquad (15)$$

$$\gamma = \frac{P_2 \times (k_2 - k_1)}{(k_1 - k_0) \times (k_2 - k_0)} \qquad (16)$$

$$\because P_0 = 0, P_2 = 2 \times P_1$$

The calibration values of the coefficients α, β and γ are stored to E2PROM of non-volatile memory (not shown) as the calibration value of the electro-capacitance pressure sensor 1. The stored calibration values of α, β and γ are called by the calibration arithmetic section of the processor in measuring pressure by the electro-capacitance pressure sensor 1 and are assigned to the formula (13). After the electro-capacitance C1 and C2 are detected in accordance with the unknown measurement pressure, the calibration arithmetic section calculates the electro-capacitance ratio k and conducts calibration of the pressure P by the formula (13) to output.

Fundamental arithmetic section of the processor having the coefficient arithmetic section and the calibration arithmetic section calculates the above fundamental calculation formula (17) in response to predetermined arguments X, Y, Z and W from the coefficient arithmetic section and the calibration arithmetic section and outputs result f of the calculation to the coefficient arithmetic section or the calibration arithmetic section. Incidentally, the formula (17) is identical with the above-described formula (7).

$$f = \frac{Z - W}{X - Y} \qquad (17)$$

Such fundamental arithmetic section works in calibrating for calculating the coefficients α, β and γ, and in measuring unknown pressure by the electro-capacitance pressure sensor 1, as follows.

(1) Calculating Coefficients α, β and γ (Calibration of the Electro-Capacitance Pressure Sensor 1).

The calculation formula (14) of the coefficient α can be modified into following formula (18).

$$\alpha = \frac{k_2 - 2 \times k_1 + k_0}{(k_1 - k_0) \times (k_2 - k_0)} = \frac{(1 - 0)}{(k_1 - k_0)} - \frac{(0 - 2)}{(k_2 - k_0)} \qquad (18)$$

The coefficient arithmetic section outputs, for instance, $k_1$, $k_0$, 1 and 0 of the first term of the formula (18) as arguments X, Y, Z and W of the fundamental calculation formula (17). The fundamental arithmetic section conducts calculation given by the formula (17) and outputs the calculation result f to the coefficient arithmetic section. The calibration value of the coefficient α can be calculated to sequentially obtain the calculation result f by repeating similar process after the first term.

The calculation formula (15) of the coefficient γ can be similarly modified into formula (19). The calibration value of the coefficient γ can be calculated by repeating the calculation in the fundamental arithmetic section in plural times, similarly to the above.

$$\gamma = \frac{(P_2 - 0)}{(k_1 - k_0)} - \frac{(P_2 - 0)}{(k_2 - k_0)} \qquad (19)$$

(2) Actual Pressure Measurement by the Electro-Capacitance Pressure Sensor 1

As described above, the calculated coefficients α, β and γ are stored in E2PROM as a non-volatile memory after completing the calibration of the electro-capacitance pressure sensor 1. The coefficients α, β and γ are called by the calibration arithmetic section in conducting measurement by the electro-capacitance sensor 1. The calibration arithmetic section detects the electro-capacitance C1 and C2, calculates the electro-capacitance ratio k (first correction) and converts the pressure P by the formula (13) to output (feedback correction). More specifically, the fundamental arithmetic section is used for the calculation and conversion as follows.

First, when the electro-capacitance ratio k is calculated by the electro-capacitance C1 and C2, the electro-capacitance ratio k(=C2/C1) can be modified into formula (20).

$$k = \frac{C2}{C1} = \frac{C2 - 0}{C1 - 0} \qquad (20)$$

In short, the calibration arithmetic section outputs C1, 0, C2 and 0 as the arguments X, Y, Z and W to the fundamental arithmetic section to obtain the calculation result f as the electro-capacitance ratio k.

Next, the formula (13) can be modified into following formula (21).

$$P = \frac{\gamma \times (k - \beta)}{1 + \alpha \times (k - \beta)} = \frac{\gamma - 0}{\frac{1 - 0}{(k - \beta)} - \frac{\alpha - 0}{(1 - 2)}} \qquad (21)$$

Accordingly, similarly to the above, the calibration arithmetic section can obtain the converted pressure P by making the fundamental arithmetic section repeatingly conduct calculation corresponding to the fundamental calculation formula (17) in the formula (21).

According to the present invention, since the processor has the fundamental arithmetic section for calculating the fundamental calculation formula (17), a part of the calculation by the coefficient arithmetic section and the calibration arithmetic section can be conducted by the fundamental arithmetic section, thereby simplifying the structure of the coefficient arithmetic section and calibration arithmetic section. Further, since the fundamental arithmetic section is used both for calibration of the sensor and the measurement, the processor can be made efficient by eliminating extra portion of the processor. Accordingly, the structure of the entire processor can be simplified, thereby reducing the total production cost including cost for calibration work of the self-calibrating sensor and component cost.

In the above, the processor is preferably provided on the sensor and composed of integrated circuit including CPU (Central Processing Unit). In other words, since the processor is provided on the sensor and is composed of integrated circuit including CPU, the sensor can be made as a self-calibrating sensor, thereby largely reducing the cost for the calibration work of the sensor, as described above.

Further, the above-described sensor preferably has a non-volatile memory of which recorded information is not lost even when the power supply from the outside is shut off, and the coefficients $\alpha$, $\beta$ and $\gamma$ calculated by the coefficient arithmetic section are preferably stored in the non-volatile memory.

EPROM (Erasable Programmable Read Only Memory) of which recorded information can be erased by ultraviolet rays and E2PROM of which recorded information can be electrically erased are preferably used for the non-volatile memory. Since the sensor has such non-volatile memory, the coefficients $\alpha$, $\beta$ and $\gamma$ are permanently stored in the memory after the calibration work is conducted in the self-calibrating sensor once, thereby eliminating the need for repeated calibration work in the subsequent use of the sensor.

BRIEF DESCRIPTION OF THE DRAWINGS

FIG. 5 is a vertical cross section for showing an electro-capacitance sensor according to second embodiment of the present invention;

FIG. 7 is a graph showing a relationship between pressure and electro-capacitance ratio after conducting first correction in the aforesaid embodiment;

FIG. 8 is a graph showing a relationship between pressure and electro-capacitance ratio after conducting feedback correction in the aforesaid embodiment;

DETAILED DESCRIPTION OF PREFERRED EMBODIMENT(S)

A preferred embodiment of the present invention will be described below with reference to drawings. Incidentally, description for components identical or similar to the above-described components will be omitted.

Figure 4:
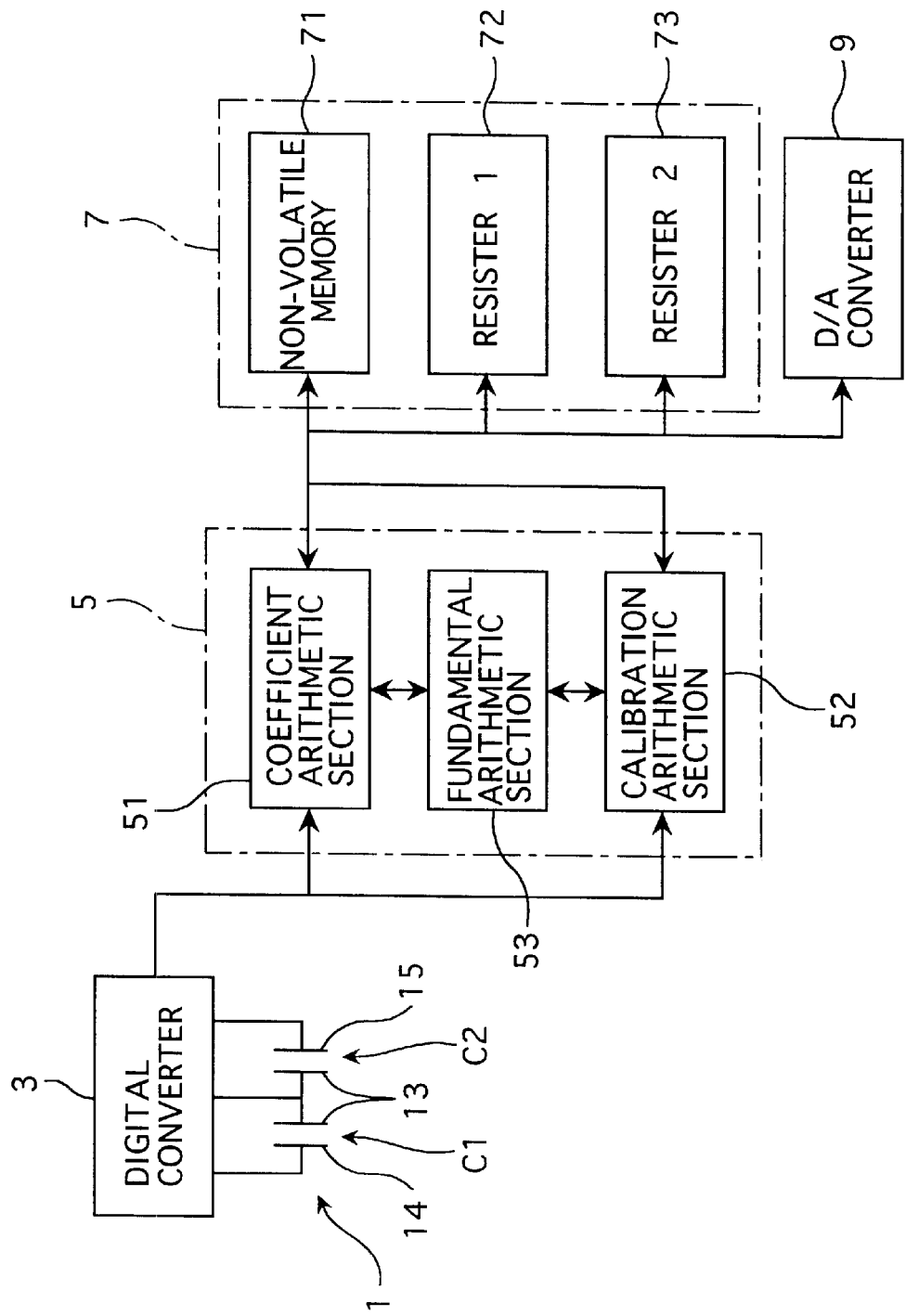
FIG. 4 is a block diagram showing a structure of a signal processing circuit of a sensor according to first embodiment of the present invention.

A sensor and signal processing circuit according to first embodiment is shown in FIG. 4.

Figure 1:
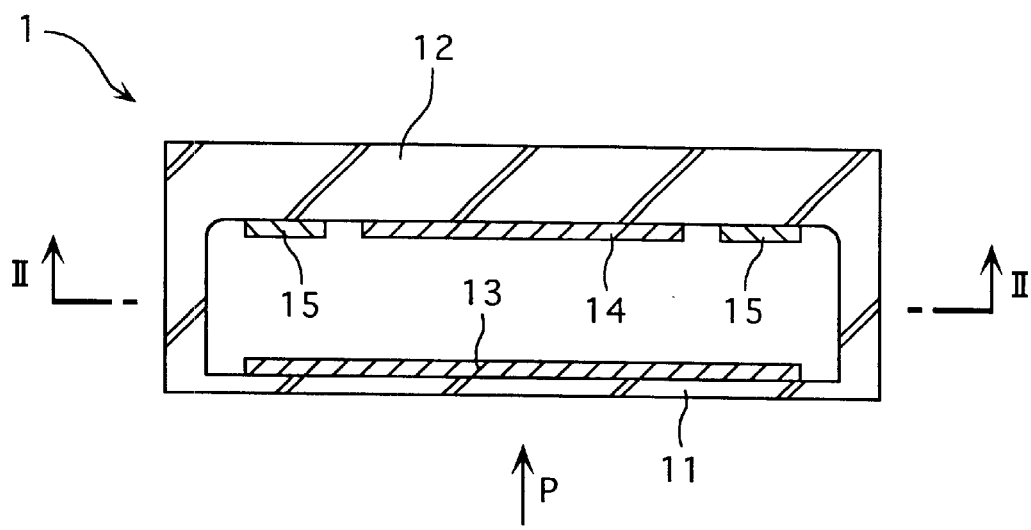
FIG. 1 is a vertical cross section showing a structure of an electro-capacitance sensor for illustrating effects of the present invention.
Figure 2:
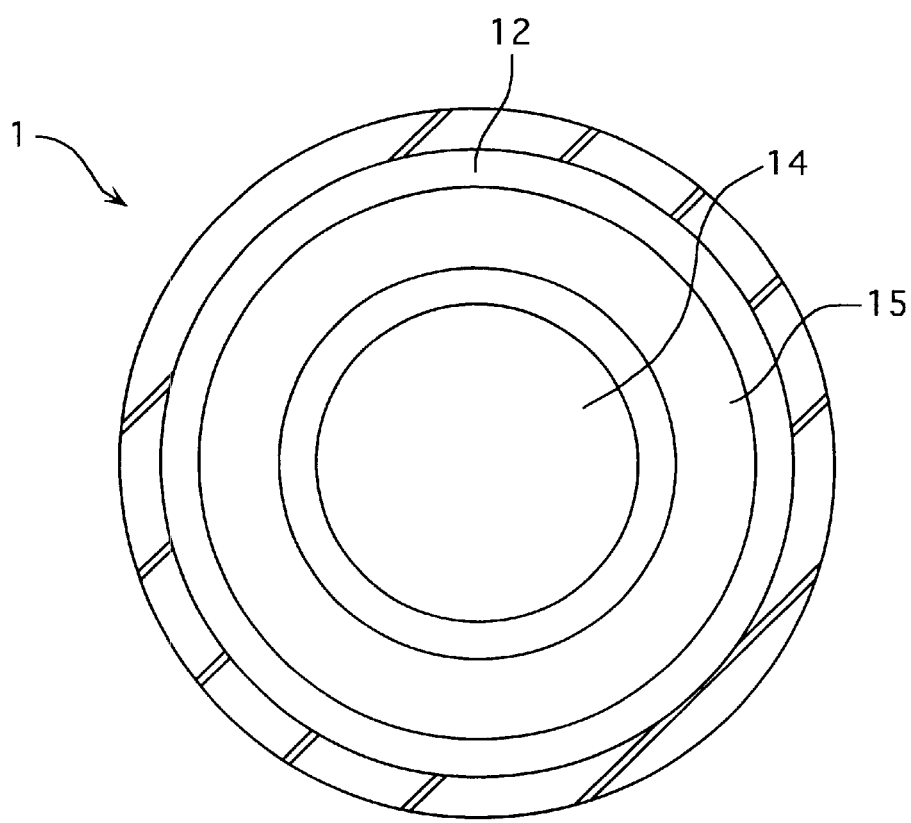
FIG. 2 is a cross-section taken along II—II line in FIG. 1.
Figure 3:
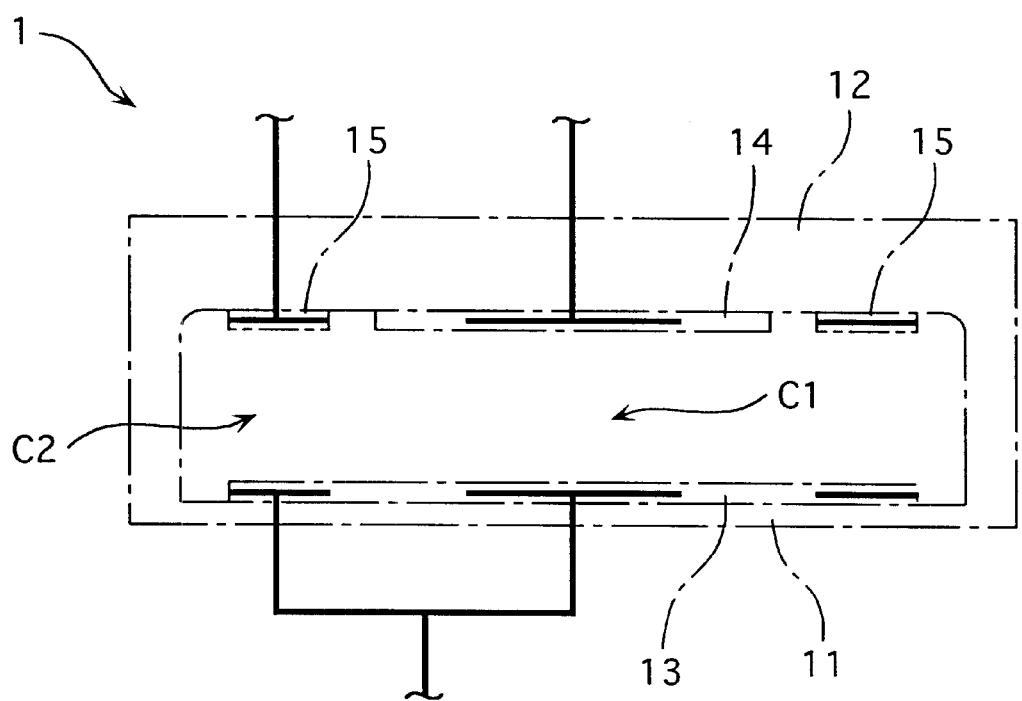
FIG. 3 is a rough illustration showing the effects of the present invention.

An electro-capacitance pressure sensor 1 shown in the aforesaid FIGS. 1 to 3 is provided with a processor 5 through a digital converter 3 as a signal output means, the processor 5 being connected to a memory 7 and a D/A converter 9 for outputting to the outside.

All of the digital converter 3, the processor 5, the memory 7 and the D/A converter 9 are composed of ASIC (Application Specific Integrated Circuit), which is installed integrally to the electro-capacitance pressure sensor 1. The electro-capacitance pressure sensor 1 is configured as a self-calibrating sensor which calculates calibration value and conducts calibration calculation based thereon.

The processor 5 includes a coefficient arithmetic section 51, a calibration arithmetic section 52 and a fundamental arithmetic section 53.

The coefficient arithmetic section 51 calculates coefficients $\alpha$, $\beta$ and $\gamma$ from known calibration pressure $P_0$, $P_1$ and $P_2$ and electro-capacitance ratio $k_0$, $k_1$ and $k_2$ based on formulas (14) to (16).

The calibration arithmetic section 52 assigns $\alpha$, $\beta$ and $\gamma$ calculated by the coefficient arithmetic section 51 into formula (13), obtains pressure reduced value P by conducting calibration calculation by the formula (13) based on electro-capacitance C1 and C2 detected correspondingly to unknown measurement pressure, and outputs to the D/A converter 9.

The fundamental arithmetic section 53 conducts calculation given by the basic calculation formula (17) using predetermined arguments X, Y, Z and W inputted by the coefficient arithmetic section 51 or the calibration arithmetic section 52, and outputs the calculation result f to the coefficient arithmetic section 51 and calibration arithmetic section 52.

The memory 7 is provided integrally with the electro-capacitance pressure sensor 1 and has a non-volatile memory 71 composed of E2PROM, first register 72 and second register 73. The first register 72 and the second register 73 are formed by dividing internal memory area of RAM (Random Access Memory) having a predetermined storage capacity, which temporarily stores the calculation result f by the fundamental arithmetic section 53 for calculation of the above coefficient arithmetic section 51 and the calibration arithmetic section 52.

The calibration work and actual pressure measurement of the above-configured signal processing circuit and the electro-capacitance pressure sensor 1 are conducted as follows.

(1) Applying Known Calibration Pressure and Calculating Electro-Capacitance Ratio Known calibration pressure $P_0$, $P_1$ and $P_2$ are applied to the electro-capacitance pressure sensor 1 for calibrating the electro-capacitance pressure sensor 1. The electro-capacitance C1 (of capacitor composed of the movable electrode 13 and the first fixed electrode 14) and the electro-capacitance C2 (of capacitor composed of the movable electrode 13 and the second fixed electrode 15) for respectively applied pressure are outputted to the coefficient arithmetic section 51 through the digital converter 3. The coefficient arithmetic section 51 calculates electro-capacitance ratio $k_0$, $k_1$ and $k_2$ at the respective calibration pressure $P_0$, $P_1$ and $P_2$ from the detected electro-capacitance C1 and C2 and outputs the calibration pressure $P_0$, $P_1$ and $P_2$ and the electro-capacitance ratio $k_0$, $k_1$ and $k_2$ to the memory are (not shown) of the memory 7 to store therein.

(2) Calculating Coefficients α, β, γ

The coefficients α, β and γ are calculated by inputting and outputting the data between the coefficient arithmetic section 51 and the fundamental arithmetic section 53 in plural times. The intermediate calculation result by the fundamental arithmetic section 53 is temporarily stored to the first register 71 and the second register 73.

(2-1) Calculation of Coefficient α

The coefficient α is calculated by the above formula (18) and the formula (17) in the fundamental arithmetic section 53 is conducted in three steps as shown in Table 1.

TABLE 1

| Calibration Value | Step | Argument | | | | Working Register |
|---|---|---|---|---|---|---|
| | | X | Y | Z | W | |
| α | 1 | $k_1$ | $k_0$ | 1 | 0 | REG1 |
| | 2 | $k_2$ | $k_0$ | 0 | 2 | REG2 |
| | 3 | 2 | 1 | REG1 | REG2 | |

In the first step, the coefficient arithmetic section 51 sets $k_1$ of first term of the formula (18) as X, $k_0$ as Y, 1 as Z and 0 as W, and outputs to the fundamental arithmetic section 53. The fundamental arithmetic section 53 conducts calculation represented by the formula (17) based on the arguments X, Y, Z and W inputted by the coefficient arithmetic section 51 and the calculation result REG1 is stored in the first register 72.

In the second step, the coefficient arithmetic section 51 sets $k_2$ of second term of the formula (18) as X, $k_0$ as Y, 0 as Z and 2 as W, and outputs to the fundamental arithmetic section 53. The calculation result REG2 by the fundamental arithmetic section 53 is stored in the second register 73.

In the third step, the coefficient arithmetic section 51 sets 2 as X, 1 as Y, REG1 stored in the first register 71 as Z and REG2 stored in the second register 73 as W, and outputs to the fundamental arithmetic section 53. The fundamental arithmetic section 53 calculates in the similar manner to the above.

As shown in formula (18), the calculation result obtained in the third step is calibration value of coefficient α, which is recorded and stored in the non-volatile memory 71 through the coefficient arithmetic section 51. Incidentally, the X=2 and Y=1 of the third step is a value set for the convenience of making X−Y=1. The values may be set as X=1 and Y=0.

(2-2) Calculating Coefficient β

Since $\beta=k_0$ as shown in the formula (15), the coefficient value of $\beta=k_0$ should be outputted from the coefficient arithmetic section 51 to the non-volatile memory 71 to be stored without conducting calculation by the fundamental arithmetic section 53. Incidentally, when the coefficients α, β and γ are set to be regularly calculated by the fundamental arithmetic section 53, the formula (15) should be modified into following formula (22), so that one calculation result by the fundamental arithmetic section 53 is outputted to the non-volatile memory 71 to be stored.

$$\beta = k_0 = \frac{k_0 - 0}{2 - 1} \quad (22)$$

(2-3) Calculating Coefficient γ

The coefficient γ is calculated by the formula (19). As in calculation of the coefficient α, the calculation by the formula (17) in the fundamental arithmetic section 53 is conducted in three-steps. The values shown in Table 2 are set to the arguments X, Y, Z and W outputted by the coefficient arithmetic section 51. The result of the three-step calculation is stored in the non-volatile memory 71 as a calibration value of the coefficient γ.

TABLE 2

| Calibration Value | Step | Argument | | | | Working Register |
|---|---|---|---|---|---|---|
| | | X | Y | Z | W | |
| γ | 1 | $k_1$ | $k_0$ | $P_2$ | 0 | REG1 |
| | 2 | $k_2$ | $k_0$ | $P_2$ | 0 | REG2 |
| | 3 | 2 | 1 | REG1 | REG2 | |

(3) Actual Pressure Measurement by the Electro-Capacitance Pressure Sensor 1

When the calibration work is completed as described above, a pressure is followingly measured by the electro-capacitance pressure sensor 1 of which coefficients α, β, and γ are calculated.

(3-1) Calculating Electro-Capacitance Ratio k (First Correction)

The electro-capacitance C1 and C2 outputted by the electro-capacitance pressure sensor 1 through the digital converter 3 is first calibrated by the calibration arithmetic section 52 to calculate electro-capacitance ratio k. Specifically, the formula k=C1/C2 is modified as above formula (20). As shown in Table 3, one-step calculation is conducted by the fundamental arithmetric section 53 and the calculation result is stored in the first register 72 as REG1.

TABLE 3

| | Argument | | | | Working Register |
|---|---|---|---|---|---|
| Step | X | Y | Z | W | |
| 1 | C1 | 0 | C2 | 0 | REG1 |

(3-2) Calibrating Pressure P (Feedback Correction)

After above-described first correction, the calibration arithmetic section 52 calls the calculation result REG1 calculated by the first correction and values of coefficients α, β and γ calculated according to the calibration work from the first register 71 and the non-volatile memory 71 respectively, so that the pressure P is calibrated by a feedback correction based on the formula (13). Specifically, the formula (13) is modified into a form having the fundamental calculation formula (17) as shown in the formula (21). Subsequently, the arguments X, Y, Z and W shown in Table 4 is outputted from the calibration arithmetic section 52 and three-step calculation is conducted by the fundamental arithmetic section 53 to obtain pressure P.

TABLE 4

| | Argument | | | | Working Register |
|---|---|---|---|---|---|
| Step | X | Y | Z | W | |
| 1 | REG1 | β | 1 | 0 | REG1 |
| 2 | 1 | 2 | α | 0 | REG2 |
| 3 | REG1 | REG2 | γ | 0 | |

Subsequently, the measurement pressure P thus converted is outputted to the D/A converter 9 and is processed by various outside signal processing means connected to the D/A converter 9.

(3-3) Calibration by First Correction and Feedback Correction

The accuracy of pressure value is improved as shown in Table 5 after calibration of the first correction and the feedback correction. Incidentally, the calibration values of the coefficients α, β and γ in the Table 5 are obtained by seperation work.

TABLE 5

| Pressure (kgf/cm2) | 0.0 | 1.5 | 3.0 |
|---|---|---|---|
| C1 (pf) | 28.97 | 34.23 | 42.13 |
| C2 (pf) | 31.36 | 32.86 | 34.55 |
| k (C2/C1) | 1.0825 | 0.96 | 0.82 |
| Output after feedback calibration | 0.000 | 1.500 | 3.000 |
| Calibration Value α | | −0.54035 | |
| Calibration Value β | | −1.0825 | |
| Calibration Value γ | | −13.053 | |

It is observed that the linearity, gain and offset between actual value of the pressure of the workpiece and the output of the electro-capacitance pressure sensor 1are calibrated by the calibration of the feedback correction as described above, so that the sensor output of the electro-capacitance pressure sensor 1 accurately corresponds to unknown measurement pressure.

According to the aforesaid first embodiment, following effects can be obtained.

Since the processor 5 has the fundamental arithmetic section 53, a part of the calibration of the coefficient arithmetic section 51 and the calibration arithmetic section 52 can be conducted by the fundamental arithmetic section 53, thereby simplifying the structure of the coefficient arithmetic section 51 and the calibration arithmetic section 52.

Since the fundamental arithmetic section 53 is used both for calibration work of the electro-capacitance pressure sensor 1 and the actual pressure measurement, no extra section is necessary for the processor 5. Accordingly, the entire structure of the processor 5 can be simplified, so that the cost for the calibration work can be largely reduced in a self-calibrating electro-capacitance pressure sensor 1 without largely increasing the cost of the components, thereby reducing the total cost.

Since the processor 5 is composed of the ASIC including CPU and is integrally mounted on the electro-capacitance pressure sensor 1, the electro-capacitance pressure sensor 1 can be made into a self-calibrating sensor, thereby largely reducing the cost for the calibration work of the sensor.

Further, since the electro-capacitance pressure sensor 1 has the non-volatile memory 71 structuring the memory 7 and the non-volatile memory 71 is composed of E2PROM of which recorded information is not lost even when the outside power supply is shut off, the calibration values of the coefficients α, β and γ are permanently stored after conducting calibration work once, thereby eliminating the need for repeated calibration work in subsequent use of the electro-capacitance pressure sensor 1.

Since the memory 7 has the first register 71 and the second register 73 for temporarily storing the intermediate calculation result by the fundamental arithmetic section 53, the complicated calculation shown in the formulas (13) to (16) can be simply conducted by the fundamental arithmetic section 53 by combining a plurality of the calculation shown by the fundamental calculation formula (17).

Second embodiment of the present invention will be described below.

In the electro-capacitance pressure sensor 1 according to the above-described embodiment, the movable electrode 13 is provided on one surface of the diaphragm 11 and the first and the second fixed electrodes 14 and 15 are formed on the substrate 12 supporting the diaphragm 11 and opposing the movable electrode 13.

On the other hand, an electro-capacitance pressure sensor 101 according to the second embodiment has movable electrodes 113 formed on both sides of the diaphragm 111 as shown in FIG. 5. First fixed electrode 114 is provided opposedly to one of the movable electrodes 113 and second fixed electrode 115 is opposing the other one of the movable electrodes 113. The electro-capacitance pressure sensor 101 forms a differential pressure sensor of which diaphragm 111 deforms in proportion to a pressure difference $P_1-P_2$, the pressure $P_1$ and $P_2$ acting on a space separated by the diaphragm 111.

Figure 6:
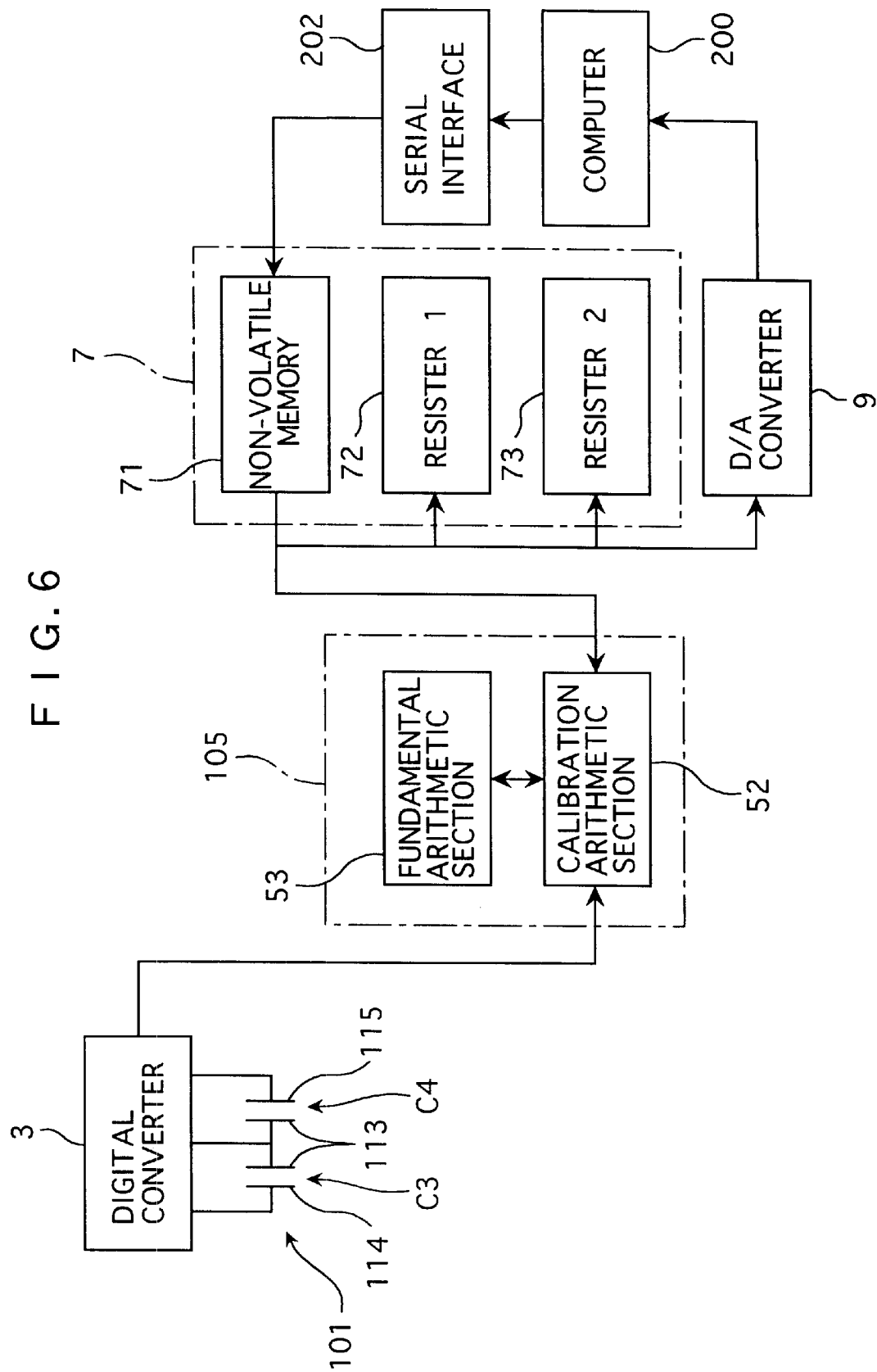
FIG. 6 is a block diagram showing a signal processing circuit of a sensor according to the aforesaid embodiment.

The processor 5 integrally mounted on the electro-capacitance pressure sensor 1 according to first embodiment includes the coefficient arithmetic section 51, the calibration arithmetic section 52 and the fundamental arithmetic section 53. On the other hand, the processor 105 of the electro-capacitance pressure sensor 101 according to the second embodiment includes only the calibration arithmetic section 52 and the fundamental arithmetic section 53 and has no coefficient arithmetic section, as shown in FIG. 6. The coefficients α, β and γ are calculated by a computer 200 as an external controller. In other words, the signal processing circuit of the second embodiment includes the processor 105 and the computer 200, which is different from the first embodiment. Accordingly, though not shown, the computer 200 includes a coefficient arithmetic section and fundamental arithmetic section similar to the coefficient arithmetic section 51 and the fundamental arithmetic section 53 of the processor 5 according to the first embodiment.

In FIG. 5, the electro-capacitance pressure sensor 101 is a differential pressure sensor, in which the electro-capacitance ratio k' is generally known to be calculated by the formula (23), instead of calculating according to simple formula of k=C2/C1 for calculating electro-capacitance ratio k. Incidentally, C3 represents electro-capacitance of a capacitor composed of electrode 113A of one of the movable electrodes 113 and the first fixed electrode 114 and C4 represents electro-capacitance of a capacitor composed of electrode 113B of the other one of the movable electrodes 113 and the second fixed electrode 115.

$$k' = \frac{C3 - C4}{C3 + C4} = \frac{C3 - C4}{C3 - (-C4)} \qquad (23)$$

As shown in the formula (23), the first correction for calculating the electro-capacitance ratio k' from the detected electro-capacitance C3 and C4 can be conducted by the fundamental arithmetic section 53. The arguments X, Y, Z and W inputted to the fundamental arithmetic section 53 should only be values shown in Table 6, thereby obtaining the electro-capacitance ratio k' by a single step calculation.

TABLE 6

| | Argument | | | | Working |
|---|---|---|---|---|---|
| Step | X | Y | Z | W | Register |
| 1 | C3 | −C4 | C3 | C4 | REG1 |

The principle for calculating the calibration values of coefficients α, β and γ and conducting feedback correction is similar to the first embodiment, and the description therefor is omitted.

However, since the processor 105 has no coefficient arithmetic section, the calibration values of the coefficients α, β and γ are calculated by the following steps, describing with reference to FIG. 6.

(1) Known calibration pressure $P_0$, $P_1$ and $P_2$ are applied to the electro-capacitance pressure sensor 101 and the electro-capacitance ratio $k_0'$, $k_1'$ and $k_2'$ are calculated in the fundamental arithmetic section 53 by the detected electro-capacitance C3 and C4. The calibration pressure $P_0$, $P_1$ and $P_2$ and electro-capacitance ratio $k_0'$, $k_1'$ and $k_2'$ are outputted to the computer 200 through the D/A converter 9.

(2) The computer 200 calculates the coefficients α, β and γ in a similar manner as described in the first embodiment using the coefficient arithmetic section and the fundamental arithmetic section. The calculated coefficients α, β and γ are outputted to the non-volatile memory 71 through a serial interface 201 and is stored in the non-volatile memory 71 as the calibration values α, β and γ.

(3) In actual pressure measurement, the feedback correction is conducted by the calibration values α, β and γ calculated by the computer 200 to obtain highly accurate pressure reduced value P.

Specifically, the relationship between the actual pressure P and the electro-capacitance ratio k' after the first correction shown in the formula (23) can be shown in a graph of FIG. 7, in which the linearity between the pressure and the electro-capacitance ratio can not be sufficiently ensured only by the first correction given by the formula (23).

On the other hand, the relationship between the actual pressure P and the sensor output after conducting the feedback correction given by the formula (13) can be shown in a graph of FIG. 8 indicating high linearity.

According to the above-described second embodiment, following effects as well as the effects in the first embodiment can be obtained.

Since the coefficients α, β and γ are calculated by the coefficient arithmetic section of the computer 200 and the fundamental arithmetic section, the coefficient arithmetic section in the processor 105 can be omitted, thereby further simplifying the structure of the processor 105.

Incidentally, though the computer 200 is requisite for the calibration work in the second embodiment, the coefficients α, β and γ can be calculated by a regular process in a manner similar to the above-described first embodiment. Accordingly, the calibration work does not get too much complicated on account of the regular process, so that the total production cost of the electro-capacitance pressure sensor 101 is not increased.

Incidentally, the scope of the present invention is not limited to the above-described first embodiment and the second embodiment, but includes following modifications.

In the above-described embodiments, the electro-capacitance sensors 1 and 101 are pressure sensors. However, the present invention can be applied to an acceleration sensor, a vibration sensor and the like. In short, the present invention can be applied to any sensors in which the change in physical amount of the workpiece is electrically detected and is outputted as an electric signal.

Though the signal processing circuit of the sensor is used for calculating the calibration values of the electro-capacitance sensors 1 and 101 and calibrating thereof in the respective embodiments, the present invention may be applied to a strain gauge sensor.

Figure 9:
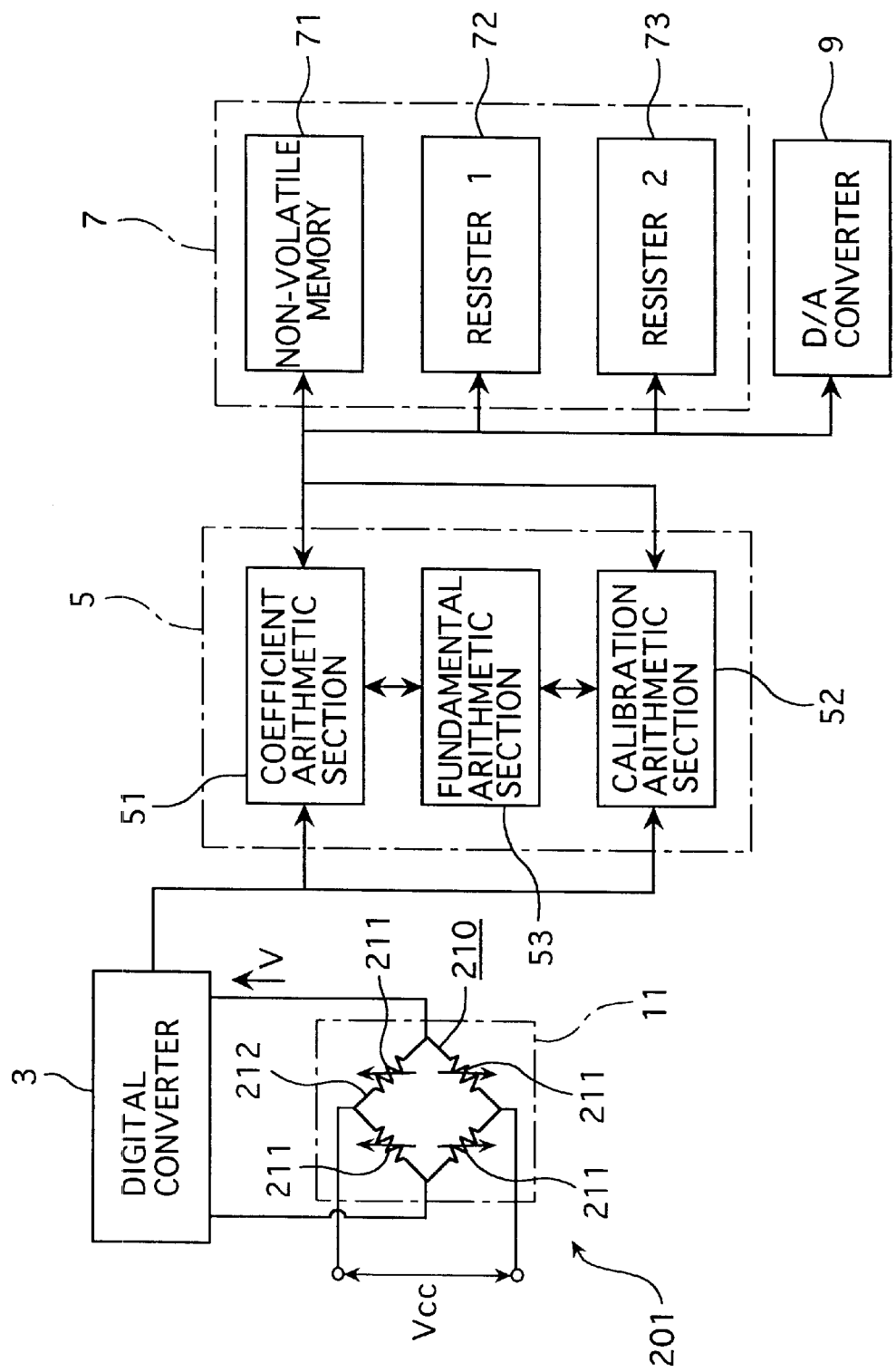
FIG. 9 is a block diagram showing a sensor and a signal processing circuit of the sensor according to a modification of the first embodiment.
Figure 10:
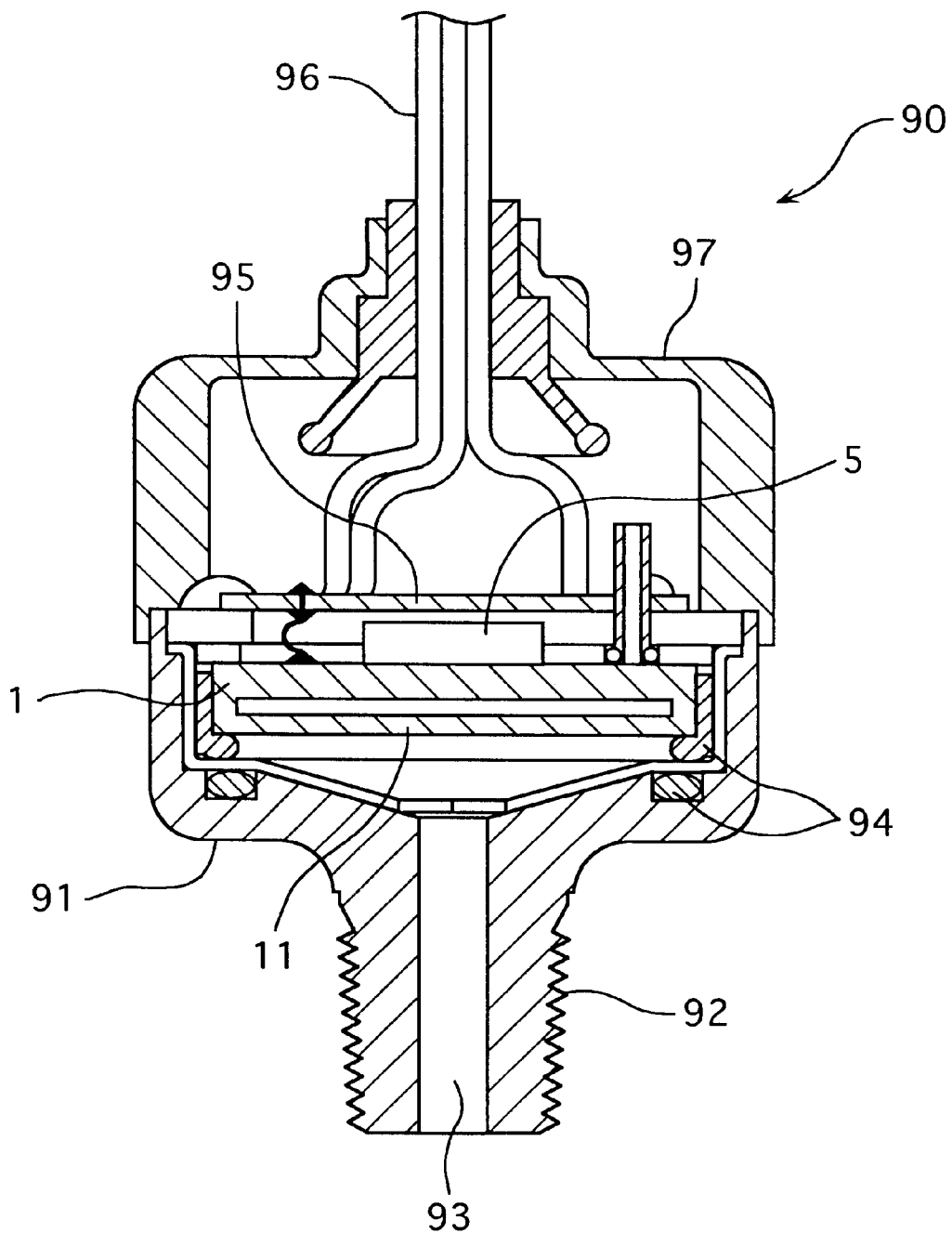
FIG. 10 is an illustration showing entire structure of conventional pressure detector having installed with the pressure sensor shown in FIGS. 1 to 3.

As shown in FIG. 9, a strain gauge sensor 201 has a diaphragm 11 deforming in proportion to the change in the pressure of the workpiece and a strain gauge sensor element 210 mounted on the diaphragm 11 for electrically detecting the deformation of the diaphragm 11.

The strain gauge sensor element 210 has a bridge circuit 212 having four strain gauges 211 mutually and electrically connected by electric wiring, so that potential difference V between a pair of ends of the bridge circuit 212 is detected. A predetermined voltage Vcc is applied to the bridge circuit 212. When resistance value of the strain gauge 211 changes in accordance with the deformation of the diaphragm 11 by the change in the pressure of the workpiece, the change in potential difference V is outputted to the digital converter 3. The potential difference V detected by the sensor element 210 is amplified and converted by the digital converter 3 to be outputted to the processor 5. Incidentally, the processor 5, the memory 7 and the D/A converter 9 etc. structuring the signal processing circuit is substantially the same as the signal processing circuit of the aforesaid first embodiment.

When the strain gauge sensor 201 is calibrated by the transforming formula (6) described in the first embodiment, it is observed that the output V of the strain gauge sensor 201 accurately corresponds to the actual measurement pressure P, as shown in Table 7. Accordingly, the signal processing circuit of the sensor according to the present invention can be applied not only to electro-capacitance sensors adopted in the respective embodiments, but to the strain gauge sensors and any sensors in which the change in the physical amount of the workpiece is converted into an electric signal. When the present invention is applied to the other type of sensors, effects similar to the respective embodiments can be obtained.

TABLE 7

| Pressure (kgf/cm2) | 0.0 | 1.5 | 3.0 |
|---|---|---|---|
| Gauge output (mV DC) | −3.60 | 23.60 | 50.27 |
| Output after feedback calibration | 0.000 | 1.500 | 3.000 |
| Calibration Value α | | $-3.617 \times 10^{-4}$ | |
| Calibration Value β | | −3.6 | |
| Calibration Value γ | | $5.46 \times 10^{-2}$ | |

Though the non-volatile memory 71 is composed of E2PROM in the above embodiments, EPROM of which recorded information can be erased by ultraviolet rays may be used as the non-volatile memory. In other words, any memory can be used as long as recorded information therein is not lost even when the power of the electro-capacitance sensor is shut off and the electric power is not supplied to the memory.

Other specific structure and configuration can be used for implementing the present invention as long as the object of the present invention can be attained.

What is claimed is:

1. A signal processing circuit of a sensor for processing an electric signal, the sensor having a sensor element for electrically detecting a change in physical amount of a workpiece and a signal output means for detecting the change of the sensor element and outputting the electric signal, the signal processing circuit comprising a processor for obtaining a reduced value P of the physical amount by calibrating a detected value k obtained by the electric signal with a transforming formula of, $$P = \frac{\gamma \times (k - \beta)}{1 + \alpha \times (k - \beta)}$$

the processor comprising: a coefficient arithmetic section for calculating coefficients α, β and γ of the transforming formula by obtaining a detected value corresponding to known physical amount at three points within a measurement range of the sensor and assigning the detected value to the transforming formula; a calibration arithmetic section for obtaining the reduced value P of the physical amount by assigning the calculated coefficients α, β and γ and calibrating the detected value k detected in accordance with an unknown measured physical amount by the transforming formula; and a fundamental arithmetic section for conducting a calculation represented by the formula of, $$f = \frac{Z - W}{X - Y}$$

based on predetermined arguments X, Y, Z and W input from the coefficient arithmetic section or the calibration arithmetic section and outputting a calculation result f to the one of the coefficient arithmetic section and the calibration arithmetic section from which the predetermined arguments X, Y, Z and W are output to the fundamental arithmetic section.

2. The signal processing circuit of a sensor according to claim 1, wherein the sensor element includes a diaphragm deforming in proportion to a change in the workpiece, a movable electrode on the diaphragm, and first and second fixed electrodes formed on a substrate supporting the diaphragm opposing the movable electrode, wherein the signal output means outputs a first electro-capacitance signal C1 between the movable electrode and the first fixed electrode and a second electro-capacitance signal C2 between the movable electrode and the second fixed electrode, and wherein the detected value k is an electro-capacitance ratio of the first and the second electro-capacitance signals C1 and C2.

3. The signal processing circuit of a sensor according to claim 1, wherein the processor is provided on the sensor and comprises part of an integrated circuit including a CPU.

4. The signal processing circuit of a sensor according to claim 3, wherein the integrated circuit includes a non-volatile memory for retaining recorded information when a power supply is shut down, and wherein the coefficients α, β and γ are recorded in the non-volatile memory.

5. A signal processing circuit for processing an electric signal from a pressure sensor including a sensor element for electrically detecting a physical amount of pressure applied thereto and a signal output device for outputting an electric signal based on the pressure applied to the sensor element, the signal processing circuit comprising:

a processor for obtaining a reduced value P of the physical amount by calibrating a detected value k obtained from the electric signal with a transforming formula of:

$$P = \frac{\gamma \times (k - \beta)}{1 + \alpha \times (k - \beta)}$$

the processor comprising:

a coefficient arithmetic section for calculating coefficients α, β and γ of the transforming formula by successively obtaining detected values corresponding to known physical amounts at three points within a measurement range of the sensor and assigning the detected values to the transforming formula;

a calibration arithmetic section for obtaining the reduced value P of the physical amount by assigning the calculated coefficients α, β and γ and calibrating the detected value k detected in accordance with an unknown measured physical amount by the transforming formula; and a fundamental arithmetic section for conducting calculation f represented by the formula of, $$f = \frac{Z - W}{X - Y}$$

based on predetermined variables X, Y, Z and W input by either the coefficient arithmetic section or the calibration arithmetic section and returning a calculation result f to the one of the coefficient arithmetic section or the calibration arithmetic section from which the predetermined variables X, Y, Z and W are output to the fundamental arithmetic section, whereby the structure of the coefficient arithmetic section and the calibration arithmetic section is simplified as the fundamental arithmetic section is used for both calibrating the sensor and measurement.

6. The signal processing circuit according to claim 5, wherein the sensor element includes a diaphragm deforming in proportion to a change in the physical amount, a movable electrode on the diaphragm, and first and second fixed electrodes formed on a substrate supporting the diaphragm opposing the movable electrode, wherein the signal output device outputs a first electro-capacitance signal C1 between the movable electrode and the first fixed electrode and a second electro-capacitance signal C2 between the movable electrode and the second fixed electrode, and wherein the detected value k is an electro-capacitance ratio of the first and the second electro-capacitance signals C1 and C2.

7. The signal processing circuit according to claim 5, wherein the processor is provided on the sensor and comprises part of an integrated circuit including a CPU.

8. The signal processing circuit according to claim 7, wherein the integrated circuit includes a non-volatile memory for retaining recorded information when a power supply is shut down, and wherein the coefficients α, β and γ are recorded in the non-volatile memory to eliminate repeated calibration for a subsequent use of the sensor.

9. The signal processing circuit of claim 5, wherein the coefficient α represents feedback gain, the coefficient β represents offset and the coefficient γ represents open loop gain.

* * * * *